(12) United States Patent
Meid

(10) Patent No.: US 9,698,669 B2
(45) Date of Patent: Jul. 4, 2017

(54) CONTROL DEVICE FOR A SWITCHING DEVICE WITH SEPARATE START-UP AND HOLDING COILS

(71) Applicant: Eaton Electrical IP GmbH & Co. KG, Schoenefeld (DE)

(72) Inventor: Wolfgang Meid, Muelheim-Kaerlich (DE)

(73) Assignee: EATON ELECTRICAL IP GMBH & CO. KG, Schoenefeld (DE)

( * ) Notice: Subject to any disclaimer, the term of this patent is extended or adjusted under 35 U.S.C. 154(b) by 185 days.

(21) Appl. No.: 13/964,171

(22) Filed: Aug. 12, 2013

(65) Prior Publication Data

US 2014/0043872 A1    Feb. 13, 2014

(30) Foreign Application Priority Data

Aug. 10, 2012    (DE) .................. 10 2012 107 371

(51) Int. Cl.
| | |
|---|---|
| H01H 47/00 | (2006.01) |
| H02M 1/36 | (2007.01) |
| H01H 47/32 | (2006.01) |
| H01H 47/04 | (2006.01) |
| H01F 7/18 | (2006.01) |

(52) U.S. Cl.
CPC ............ *H02M 1/36* (2013.01); *H01F 7/1838* (2013.01); *H01H 47/04* (2013.01); *H01H 47/325* (2013.01)

(58) Field of Classification Search
CPC ........ H01H 47/22; H01H 47/32; H01H 47/04; H01H 47/325; H01F 7/1805; H01F 2007/1888; H01F 7/1838; H02M 1/36
USPC ......................................... 361/152–154, 144
See application file for complete search history.

(56) References Cited

U.S. PATENT DOCUMENTS

| | | | | |
|---|---|---|---|---|
| 5,157,307 | A * | 10/1992 | Noda ............................ | 318/372 |
| 6,327,130 | B1 * | 12/2001 | Durif et al. .................... | 361/139 |
| 6,968,859 | B1 * | 11/2005 | Nagano et al. ............... | 137/554 |
| 2002/0056443 | A1 * | 5/2002 | Yamakado et al. ........... | 123/490 |

* cited by examiner

*Primary Examiner* — Ronald W Leja
(74) *Attorney, Agent, or Firm* — Leydig, Voit & Mayer, Ltd.

(57) ABSTRACT

A control device for a switching device with separate start-up and holding coils includes control electronics to control the current supply to the start-up and holding coils and a direct voltage supply unit for the holding coil and the control electronics with the same reference potential for the holding coil and the control electronics.

15 Claims, 2 Drawing Sheets

CONTROL DEVICE FOR A SWITCHING DEVICE WITH SEPARATE START-UP AND HOLDING COILS

CROSS-REFERENCE TO RELATED APPLICATIONS

Priority is claimed to German Patent Application No. DE 10 2012 107 371.6, filed on Aug. 10, 2012, the entire disclosure of which is incorporated by reference herein.

FIELD

This invention concerns a control device for a switching device with separate start-up and holding coils, in particular a contactor, as well as a switching device with a control device of this kind.

BACKGROUND

In switching devices such as contactors for large loads, the magnetic field, with which the contact module is driven, is often generated directly from the switching device's input source. If the switching device is, say, fed with alternating voltage, a direct voltage is generated through a rectifier circuit, which acts as supply to a control device for the switching device. From this direct voltage, the control device generates a pulse width modulated (PWM) voltage, which is fed to one coil of the contact module.

For switching devices such as contactors for large loads, the switching process involves first activating the start-up circuit, which supplies the first PWM voltage for the contact module's start-up process to the contact module's coil. As soon as the start-up process is complete, the first PWM voltage for supplying the start-up coil is abruptly shut off and a second PWM voltage for the contact module's holding process is generated in the holding circuit, which is supplied to the contact module's coil during the switching device's holding operation.

SUMMARY

In an embodiment the present invention provides a control device for a switching device with separate start-up coil and holding coil, the control device comprising: control electronics configured to activate a current supply to the start-up coil and the holding coil; a direct voltage supply unit configured to supply the holding coil and the control electronics with a direct voltage with the same reference potential for the holding coil and the control electronics; a rectifier configured to generate a rectified output voltage from an alternating voltage for supplying the start-up coil; and a direct voltage converter, connected to a rectifier output, configured to generate a specified direct voltage for the direct voltage supply unit from an output voltage of the rectifier.

BRIEF DESCRIPTION OF THE DRAWINGS

Aspects of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
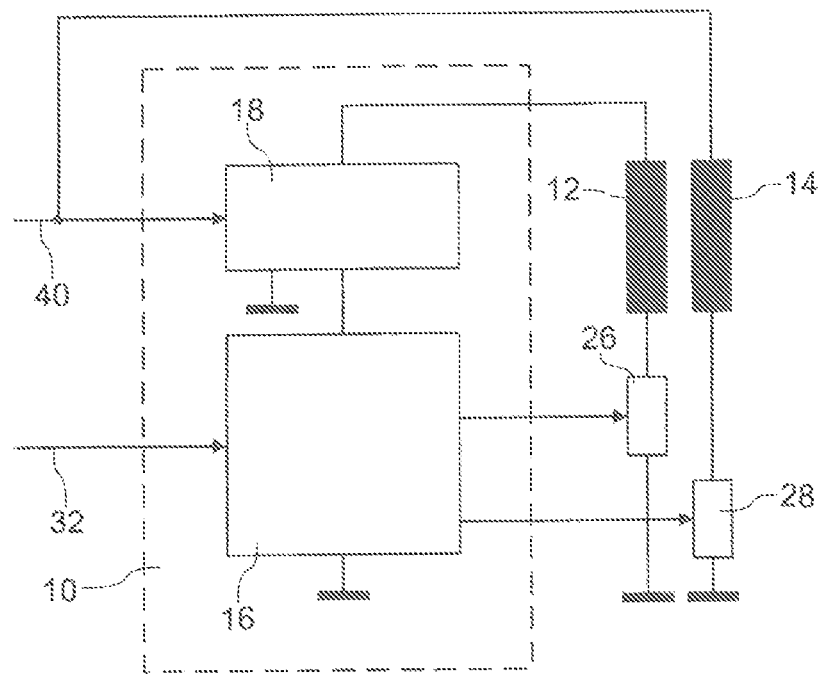
FIG. 1 a block wiring diagram of a design example of a control device for a switching device with separate start-up and holding coil according to this invention.

In an embodiment, the present invention provides an improved control device for a switching device with separate start-up and holding coil and thus, an improved switching device.

In an embodiment, the present invention provides a direct voltage supply for the holding coil of a switching device and the control electronics of the switching device with common reference potential for the holding coil and the control electronics. On the one hand, this will enable the supply to the control electronics and holding coil to be implemented more easily, as the holding coil in holding operation will have a direct voltage supply instead of a PWM voltage supply. On the other hand, the direct voltage supply to the holding coil in holding operation will enable the EMC (electromagnetic compatibility) behaviour of a switching device to be considerably improved, as considerably fewer disturbances—especially high-frequency electromagnetic interference—will be generated, which typically arise during operation with a PWM voltage. Another advantage of this invention is that a single holding coil can be deployed for different voltage variants of a switching device. This is because the holding coil in holding operation receives supply independently of the input voltage to the switching device, with the same direct voltage predetermined by the direct current supply. Furthermore, this invention also allows a reduction in the components required for implementation, as the holding coil is at the same reference potential as the control electronics, and hence there need not be different reference potentials in the switching device, which mostly require expensive circuit technology. Finally, due to this invention, the EMC behaviour remains more or less the same over various build sizes of the switching device, as the same holding coil can be deployed for the various build sizes.

In an embodiment, the present invention provides a control device for a switching device with separate start-up and holding coil with control electronics to control the current supply to the start-up and holding coil and a direct voltage supply unit for the holding coil and the control electronics with the same reference potential for the holding coil and the control electronics. The control device can, for instance, be in the form of a module, which can be deployed universally in switching devices of various sizes and input voltage ranges.

Furthermore, a direct voltage converter preconnected to the direct voltage supply unit is provided for, which is designed to generate a specified direct voltage from the output voltage of a rectifier within a specified voltage range. The direct voltage converter can, for instance, be planned and designed for a large input voltage range, in order to generate the specified direct voltage from voltages in this input voltage range; this specified direct voltage will be fed to the direct voltage supply unit, which will supply the holding coil and the control electronics.

The direct voltage supply unit can be designed to generate a first direct voltage for supplying the holding coil and a second direct voltage for supplying the control electronics, whereby the first and the second direct voltage are different. The first direct voltage can, for instance, be set such that it generates a magnetic field in the holding coil, which is sufficient to hold the contact module of the switching device during holding operation in a position such that the switch contacts, for instance, are closed. The second direct voltage can, on the other hand, be set such that it is sufficient for the control electronics' voltage supply.

The control electronics can be designed to supply a largely constant direct current to the holding coil during the switching device's holding process. As already mentioned, this can lead to an improvement in the EMC behaviour of a switching device, as no power-on and power-off processes comparable to those during operation with a PWM voltage take place, which could generate electromagnetic interference.

The control electronics can also be designed to control the supply to the start-up coil during the switching device's start-up process. For instance, the control electronics can generate a control signal for a switching element placed in the circuit between the start-up coil and a reference potential during the start-up process, which causes a pulse width modulated current to flow through the start-up coil or the start-up coil to receive a PWM voltage supply. The control electronics can shut off the switching element after the start-up process is complete by means of the control signal, such that no more current flows through the start-up coil, and activate a switching element placed in the circuit between the reference potential of the control electronics and the holding coil, such that a direct current caused by the direct voltage supply flows through the holding coil for building up a magnetic field to hold a particular state of a switching device's contact module.

In addition, the control electronics can be designed to quickly shut off the direct voltage supply to the holding coil. In particular, this quick shut-off can take place by quickly dissipating the magnetic field of the holding coil in order to accelerate a changeover in the switching device's contact module into another state.

Another embodiment of the present invention provides a switching device, in particular a contactor, with a contact module, which has a start-up coil and a separate holding coil, a control device according to this invention and as described here for controlling the current supply to the start-up and holding coil, and a rectifier for generating a rectified output voltage from an alternating voltage in a specified input voltage range, whereby the output voltage is fed to the start-up coil and the control device as supply.

The control device can have a microprocessor or microcontroller, which is configured by means of a programme saved in a memory such that during the contact module's start-up process, the start-up coil is supplied a pulse wide modulated voltage and the resulting current, and during the contact module's holding process, the holding coil is supplied a largely constant direct current.

Other advantages of and opportunities for using this invention can be seen from the following description along with the design examples shown in the diagrams.

The description, claims, summary and diagrams use the list of terms and associated reference numbers used in the list of reference diagrams attached at the end.

In the following description, identical, functionally identical and functionally interrelated elements have been given identical reference numbers. Absolute values are only given as examples and should not be understood as limiting this invention.

FIG. 1 shows a circuit with a control device 10 according to this invention for controlling the supply to a holding coil 12 and a start-up coil 14, separate from the holding coil 12, of an electromagnetic drive of a switching device. The device 10 has control electronics 16 and a direct voltage supply unit 18. On the input side, the device 10 is fed a direct voltage through a direct voltage input 40 and control signals through one or more control inputs 32. The direct voltage fed to the input 40 also serves to supply the start-up coil 14 of the electromagnetic switching device drive. On the output side, the control device 10 generates a first direct voltage for supplying the holding coil 12 and control signals for activating a first and a second switching element 26 and 28 respectively, which are placed in the circuit between the holding coil 12 and the start-up coil 14 and a reference potential.

From the direct voltage present at the input 40 of the control device 10, the direct voltage supply unit 18 generates the first direct voltage that is present at the holding coil 12, and a second direct voltage that is supplied to the control electronics 16. The first and/or second direct voltage can be controlled direct voltages. The first direct voltage can, for instance, be 14 volt and the second direct voltage can, for instance, be 3 volt. The control electronics 16 can be triggered with a switching signal fed through the control input(s) 32, in order to initiate a switching process, especially a programme-controlled one. For this purpose, during the start-up process of the contact module in which switching contacts need to be moved from an initial position into a second position, the control electronics 16 initially apply a PWM control signal to the second switching element 28, such that a current flows through the start-up coil 14, with the current being set such that the contact module can be moved. At the end of the start-up process, the control electronics 16 turn off the second switching element 28, such that no more current flows through the start-up coil 14, and turns on the first switching element 26, such that a largely constant direct current flows through the holding coil 12 for the duration of the holding process. For this purpose, the direct current should be set such that the contact module remains in the second position of the contact module's contact units. A connection from the holding coil 12 is set up to the control electronics' reference potential, through the first switching element 26.

Figure 2:
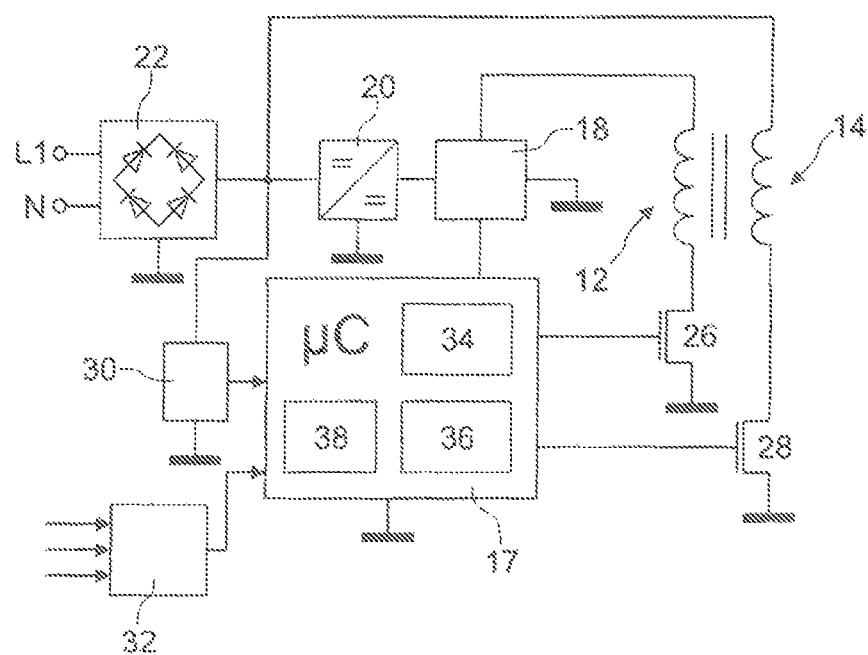
FIG. 2 a block wiring diagram of a design example of the electronics of a contactor according to this invention.

FIG. 2 shows the electronics 24 of a contactor, which are directly connected to alternating voltage lines L1 and N and are supplied through them. For this purpose, a rectifier 22 generates an uncontrolled direct voltage from an alternating voltage in a specified operating voltage range of the contactor; this direct voltage is fed in parallel to a start-up coil 14 of the contact module, a direct voltage converter 20 and a voltage measuring unit 30.

From the fed, uncontrolled direct voltage, the direct voltage converter 20 generates a specified direct voltage that is fed to the direct voltage supply unit 18 of the contactor electronics' control device. Form the specified direct voltage, the direct voltage supply unit 18 generates a first direct voltage for feeding a holding coil 12 of the contact module, and a second direct voltage for supplying a microcontroller 17 of the contactor electronics, which is a part of the control electronics, which can also have the direct voltage converter 20 and two FETs (field-effect transistors) 26 and 28 for controlling the current flow through the start-up coil 14 and the holding coil 12. Here, the second direct voltage is lower than the first direct voltage and is controlled.

The microcontroller 17 generates control signals for activating a first and a second FET (field-effect transistor) 26 and 28 respectively. The first FET 26 deployed as a switching element is placed in the circuit between the reference potential of the microcontroller 17 and the holding coil 12. The second FET 28 similarly deployed as a switching element is placed in the circuit between a reference potential and the start-up coil.

The microcontroller 17 has the following components: a quick shut-off unit 34 for quickly turning off the magnetic field generated by the holding coil 12; a PWM signal generating unit 36 for generating a PWM control signal for activating the second FET 28; a temperature compensation unit 38 for compensating for the heating of the start-up coil 14 and the reduction in the current through the start-up coil 14 caused by such heating, which could affect the functioning of the contactor.

The contactor electronics 24 also have the following control inputs 32: a low power control input for control signals with low voltage span and/or low input current; an input for control signals from a PLC (programmable logic control); other special control inputs such as especially sensitive inputs for remote control signals etc.

Following is the description of the contactor and the function flows in the contactor electronics 24. When the contactor electronics 24 are connected with the alternating voltage lines L1 and N, the alternating current, which is present at these lines and which must lie within a specified operating voltage range of the contactor electronics 24, is used to generate a second direct voltage for operating the microcontroller 17, through the rectifier 22, the direct voltage converter 20 and the direct voltage supply unit 18. As a result, the microcontroller 17 starts a contactor operating programme (contactor firmware) stored in its internal or in an external memory, which configures the microcontroller 17 such that it enters a standby mode in which it processes control signals coming in through the control inputs 32. If the microcontroller 17 detects, for instance, a switching signal at one of the control inputs 32, namely, a control signal for switching the contactor, the microcontroller—based on the contactor operating programme—first initiates a start-up process for the contactor contact module, during the which the contactor's switching contacts are brought from a first, say, open position into a second, say, closed position. The minimum time of the contactor's standby mode can, for instance, be a few milliseconds, in particular if the contactor is conventionally operated. However, it is also possible to have the contactor turn on with the application of the supply voltage. During the start-up process, the microcontroller 17 controls the PWM signal generating unit 36 such that it generates a PWM control signal, which, by means of the second FET 28, generates a current through the start-up coil 14, which in turn generates a corresponding magnetic field that causes movement of the switching contacts. As soon as the start-up process is complete, which is normally the case when the switching contacts are in the second position, the microcontroller 17 shuts off the PWM signal generation unit 36, such that the second FET 28 is opened and no more current flows through the start-up coil. Furthermore, the microcontroller 17 activates the quick shut-off unit 34 such that it interconnects the first FET 26 and the first direct voltage generated by the direct voltage supply unit 18 and present at the holding coil 12 can deliver an almost constant direct current through the holding coil 12. In this manner, the holding coil 12 generates a more or less constant magnetic field, which holds the contactor's switching contacts in the second position. When the microcontroller 17 detects a shut-off signal at one of the two control inputs 32, it activates the quick shut-off unit 34 such that it shuts off the first FET 26, by creating high impedance in its load path so that no more direct current can flow through the holding coil 12. The magnetic field of the holding coil 12 is dissipated such that the contact module's switching contacts are again moved into the first position and are, for instance, open.

The voltage measuring unit 30 primarily serves to monitor the output voltage of the rectifier 22 and in case of the limits of the specified operating voltage range of the contactor electronics being undershot or overshot by the output voltage, send a corresponding signal to the microcontroller 17, which can then initiate appropriate action, such as deactivating the contactor electronics in order to avoid damage due to overvoltage, or signalling such a state, for instance via a connected signal lamp, so that it may be detected quickly if the contactor is, for instance, being operated at an inadmissible voltage. Alternatively or in addition, the voltage measuring unit 30 can also signal the microcontroller when the rectifier's output voltage is within the specified operating voltage range.

The temperature compensation unit 38 serves to regulate the start-up current. Since the start-up coil temperature can increase during operation, the ohmic resistance of the start-up coil 14 can also increase. With the help of the temperature compensation unit 38, the PWM signal generating unit 36 can now be activated such that it correspondingly changes the PWM control signal for the FET 28 with the result that the current flowing through the start-up coil 14 remains almost constant irrespective of the coil temperature.

This invention simplifies the voltage supply to the control electronics and the holding coil of a switching device, as with a contactor. In addition, a quick shut-off of the holding coil can be implemented much more easily. This invention enables the improvement of the EMC behaviour of a switching device; in particular, the EMC behaviour can be kept almost constant over various build size of a switching device with different input voltage ranges. This invention enables deployment of one holding coil for different voltage variants of a switching device. Finally, this invention enables reduction the number of components required for a switching device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

REFERENCE NUMBERS

10 Control device for switching device
12 Holding coil
14 Start-up coil
16 Control electronics
17 Microcontroller
18 Direct voltage supply unit
20 Direct voltage converter
22 Rectifier
24 Contactor electronics
26 first switching element/first FET
28 second switching element/second FET
30 Voltage measuring unit
32 Contactor control inputs
34 Quick shut-off unit
36 PWM signal generating unit
38 Temperature compensation unit
40 Direct voltage input

The invention claimed is:

1. A control device for a switching device, the control device comprising:
a rectifier configured to generate a rectified output voltage from an alternating voltage;
a direct voltage converter configured to receive the rectified output voltage and to generate therefrom a specified direct voltage;
a direct voltage supply unit, configured to receive the specified direct voltage and to generate a first direct voltage and a second direct voltage, wherein the first direct voltage and the second direct voltage are of different magnitudes;
control electronics configured to receive the second direct voltage and to generate control signals for a first switching element and for a second switching element;
a holding coil connected to the first switching element and configured to receive the first direct voltage generated by the direct voltage supply unit; and
a start-up coil connected to the second switching element and configured to receive the rectified output voltage generated by the rectifier.

2. The control device of claim 1, wherein the control electronics are configured to supply, during a holding process of the switching device, a control signal to the first switching element that generates a constant direct current flow in the holding coil.

3. The control device of claim 1, wherein the control electronics are configured to supply, during a start-up process of the switching device, a control signal to the second switching element that generates a current flow in the start-up coil.

4. The control device of claim 1, wherein the control electronics are configured to supply, during a shut off process of the switching device, a control signal to the first switching element that prevents current flow in the holding coil.

5. The control device of claim 4, wherein the control electronics comprise a quick shut-off unit configured to supply the control signal to the first switching element that prevents current flow in the holding coil.

6. A switching device, comprising:
a contact module; and
the control device of claim 1,
wherein the contact module includes the holding coil and the start-up coil.

7. The control device of claim 6, wherein the control electronics of the control device include a microprocessor or microcontroller configured by a program stored in a memory to provide, during a start-up process of the contact module, the second switching element with a pulse width modulated voltage causing a resulting current in the start-up coil, and to provide, during a holding process of the contact module, the first switching element with a voltage causing a constant direct current to flow in the holding coil.

8. A contactor, comprising:
a contact module: and
the control device of claim 1,
wherein the contact module includes the holding coil and the start-up coil.

9. The control device of claim 1, wherein at least one of the first switching element and the second switching element is a field-effect transistor.

10. The control device of claim 1, wherein the control electronics are configured to provide, during a start-up process of the switching device, the second switching element with a pulse width modulated voltage causing a resulting current in the start-up coil.

11. The control device of claim 10, wherein resulting current in the start-up coil causes switching contacts of a contactor to move one of from an open position to a closed position or from a closed position to an open position.

12. The control device of claim 1, wherein the control electronics are configured to provide, during a holding process of the switching device, the first switching element with a voltage causing a constant direct current to flow in the holding coil.

13. The control device of claim 12, wherein the constant direct current in the holding coil causes contacts of a contactor to remain in one of an open position or a closed position.

14. The control device of claim 1, wherein at least one of the first switching element and the second switching element is connected to a reference voltage source.

15. A switching device, comprising:
a contact module including a holding coil and a separate start-up coil; and
a control device comprising:
a rectifier configured to generate a rectified output voltage from an alternating voltage;
a direct voltage converter configured to receive the rectified output voltage and to generate therefrom a specified direct voltage;
a direct voltage supply unit, configured to receive the specified direct voltage and to generate a first direct voltage and a second direct voltage, wherein the first direct voltage and the second direct voltage are of different magnitudes; and
control electronics configured to receive the second direct voltage and to generate control signals for a first switching element and for a second switching element;
wherein the holding coil is connected to the first switching element and configured to receive the first direct voltage generated by the direct voltage supply unit,
wherein the start-up coil is connected to the second switching element and configured to receive the rectified output voltage generated by the rectifier, and
wherein the control electronics of the control device include a microprocessor or microcontroller configured by a program stored in a memory to provide, during a start-up process of the contact module, the second switching element with a pulse width modulated voltage causing a resulting current in the start-up coil, and to provide, during a holding process of the contact module, the first switching element with a voltage causing a constant direct current to flow in the holding coil.

* * * * *